United States Patent Office 2,967,857
Patented Jan. 10, 1961

2,967,857

TREATMENT FOR STABILIZING POLYMERIZED OLEFINS PREPARED WITH CATALYTIC METAL COMPOUNDS

Charles R. Pfeifer and Richard O. Whipple, Midland, Mich., assignors to The Dow Chemical Company, Midland, Mich., a corporation of Delaware No Drawing. Filed Oct. 10, 1955, Ser. No. 539,698

5 Claims. (Cl. 260—94.9)

This invention relates to a method for treating polymerized olefinic and other ethylenically unsaturated materials which have been prepared with catalytic metal compounds to stabilize them against darkening and degradation particularly during subsequent forming operations.

Various olefins and other ethylenically unsaturated materials, particularly ethylene, may be efficiently polymerized, even as relatively impure materials, to high molecular weight polymeric compounds at comparatively low pressures and temperatures, according to a process first proposed by Karl Ziegler and his associates in Germany. In this process, mixtures of strong reducing agents such as aluminum alkyls with compounds of group IV–B, V–B and VI–B metals of the periodic system including thorium and uranium are employed as catalysts for the polymerization. Polyethylenes, for example, having average molecular weights in excess of 50,000 and as large as 100,000 to 3,000,000 can be manufactured by polymerizing ethylene gas with such catalysts at temperatures beneath about 100° C. and under pressures less than about 100 atmospheres. It is preferable when employing such catalysts according to the Ziegler process to operate at temperatures of about 50° C. and under pressures between about 1 and 10 atmospheres. The reaction may suitably be conducted in the presence of an organic liquid medium such as hexane, benzene and the like.

The polyethylenes prepared by the Ziegler process have superior and highly desirable properties. For example, they may be made containing less than 3 and even less than 0.03 methyl groups per each 100 methylene groups in the polymer molecule. The polymer molecules are practically completely linear and are crystalline almost to their melting points, which usually are in the neighborhood of about 125–135° C. They are insoluble in most solvents at ordinary temperatures. Shaped articles formed with such polyethylenes have tear strengths between about 1400 and 2800 pounds per square inch. Unstretched films prepared from them have tensile strengths in excess of about 2800 pounds per square inch and may be oriented by stretching to polyethylene film structures having tensile strengths as high as about 42,500 pounds per square inch.

The strong reducing agents which advantageously are employed in the catalyst mixtures of the Ziegler process include, among other compounds, a variety of aluminum trialkyls such as aluminum trimethyl, aluminum triethyl, aluminum tripropyl, aluminum triisobutyl and higher aluminum trialkyls as well as dialkyl aluminum halides, dialkyl aluminum hydrides and dialkyl aluminum alkoxides. Salts of metals selected from the group consisting of titanium, zirconium, uranium, thorium and chromium are preferably employed as the group IV–B, V–B and VI–B metallic compounds in the catalyst although salts of the remaining metals in these sub-groups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in the catalyst.

A particularly active catalyst mixture for the Ziegler process may be obtained by mixing a titanium or zirconium compound, such as a tetrachloride, oxychloride or acetyl acetonate with an aluminum trialkyl or a dialkyl aluminum compound. Generally, the molar quantities of the aluminum alkyl employed to constitute the catalyst admixture are two to three times the valence of the group IV–B, V–B and VI–B metal compound for each mole of the latter compound which is present, although many other ratios may also be employed satisfactorily. Amounts of the catalyst admixture varying from 0.01 to a few percent by weight, depending on the degree of purity of the materials being polymerized, the desired rate of polymerization and the intended molecular weight, may suitably be employed.

After polymerization according to the Ziegler process, however, polyethylene and similar polymerized products contain residues from the admixed metallic catalyst employed. The residues are not sufficiently removed by the conventionally utilized aftertreatment of polymeric materials prepared according to the Ziegler process. Such aftertreatment usually involves filtration, preferably in the presence of air (which tends to lighten the color of the product), to separate the polymerization product from the reaction mass. This may be followed by sequential trituration with hexane, isopropanol, water, acetone and pentane prior to drying. When higher catalyst concentrations are employed in the Ziegler process, some of the metallic compounds may be removed from the polymeric product by extracting it with methanolic hydrochloric acid then washing it in methanol or acetone. Butanol washings after the filtration in air have also been proposed to decompose and remove the catalyst residues.

It has been observed that the presence of metallic catalytic residues in polymeric materials prepared according to the Ziegler process tends to impart certain undesirable characteristics to the polymers. For example, such polymers, when subsequently molded or otherwise shaped in the presence of heat tend to become darker than is desirable due to the presence of the catalyst residue. Such darkening seriously restricts the utility of polymers prepared according to the Ziegler process.

It would be advantageous, therefore, to treat polyethylene and other polymers prepared according to the Ziegler process in such a manner that their tendency to darken or degrade upon being shaped, molded or otherwise formed into structures would be lessened or, for all practical purposes, eliminated. Active hydrogen compounds (including, among others, water and aliphatic alcohols) may be employed for this purpose according to the disclosure contained in the copending application of Richard O. Whipple and Charles R. Pfeifer, Serial No. 530,398, filed August 24, 1955. In the disclosed method, the catalyst residue containing polymer is treated with the active hydrogen compound before there is permitted any exposure of the polymer to air. It would be additionally advantageous, however, for such treatment to be available for attaining the desired result with utmost efficiency and simplicity while using relatively inexpensive treating materials.

These and other desiderata may be accomplished according to the method of the present invention by treating polymerized olefinic and other ethylenically unsaturated materials, particularly polyethylene, prepared according to the herein described Ziegler process and containing residues from the catalyst, with water containing a dissolved surfactant material before there is permitted any exposure of the polymerized product to air. Advantageously, the treatment is conducted with efficient agitation of the ingredients. The treatment tends to nullify the consequences of having catalyst residues remaining in the polymerized product. Such effect may be characterized as "quenching" or "killing" the catalyst. Polymeric materials treated in accordance with the present invention may readily be molded, shaped or formed in any desired manner and in the presence of heat without tending to darken or discolor to an objectionable degree.

Various surfactant materials may be employed with water for the treatment method of the present invention. Although any type of surfactant may advantageously be utilized, non-ionic materials may frequently be employed with more favorable results. Examples of suitable surface active agents include such non-ionic materials as the surface active polyglycol ether compounds including the type that is illustrated by the dodecyl phenyl monoether of a polyethylene glycol having about 12 ethylene oxide units in the polyglycol chain; aryl polyether alcohols such as those which are available under the trade-name "Triton NE"; alkylated aryl polyether alcohols such as those which are available under the trade-name "Triton X-100"; polyoxyethylated polypropylene glycols such as those which are available under the trade-name "Pluronic L-62"; such anionic materials as the diesters of sodium sulfosuccinic acid such as those which are available under the trade-name "Aerosol MA"; amylnaphthalene sodium sulfonates such as those which are available under the trade-name "Dynesol K50"; sodium hexametaphosphates such as those which are available under the trade-name "Calgon"; the neutral salts of ethylene diamine tetraacetic acid such as those which are available under the trade-name "Versene"; and such cationic materials as the dodecylamine acetates such as those which are available under the trade-name "Armac 12D." Other like and equivalent surfactants may also be employed.

It is advantageous for the concentration of the surfactant in the water to be between about 0.03 and about 5.0 percent by weight. Aqueous surfactant solutions which contain at least about 0.05 percent by weight of the surfactant may frequently be more advantageously employed. Usually at least about 0.5 part by weight of the surfactant-containing water is required to treat each part by weight of the polymerized product although frequently this ratio may be as high as several hundred parts to one.

The treatment of the present invention may be conducted at temperatures between the freezing point of the aqueous surfactant solution which is usually in the vicinity of about 0° C. and the boiling point of the solution at whatever pressure is being employed for the treatment. Any desired pressure may be utilized, although pressures in the range of about 1 to 2 atmospheres are particularly advantageous. The length of treatment depends merely upon the time required to thoroughly subject the polymerized product to the surfactant solution. This may vary from a matter of several seconds to several hours. Efficient agitation may thus be advantageously employed to minimize the time required for treatment.

Conveniently, the treatment may be conducted directly in the reaction mass after polymerization and before the product is filtered or otherwise permitted to be exposed to air. After the treatment of the present invention, the treated polymerized product may be recovered, without any loss being incurred, by filtration and a similar subsequent series of washing steps and drying as is usually employed in the after-treatment of the Ziegler process with the exception, if it is desired, that the water wash may then be eliminated.

In order to further illustrate the invention but without being restricted thereto, the following examples are given.

Example I

Relatively pure monomeric ethylene was polymerized according to the herein described Ziegler process using admixtures of aluminum triethyl and titanium tetrachloride as catalysts and conducting the polymerization in hexane. The polyethylene was treated according to the usually practiced aftertreatment of the Ziegler process which consists of filtering the polymer from the reaction mass in the presence of air, then triturating in sequence with hexane, with isopropanol, with water, with acetone and with pentane prior to drying. Although the chloride content of the polymer, which is indicative of the proportion of catalyst residue remaining in the polymer, was not found to be in excess of about 0.06 percent by weight, the polyethylene product, when molded, became discolored to a brownish color. This indicated that the catalyst residue had not been sufficiently inactivated or quenched for satisfactory utilization of the polymer in molding applications.

In contrast, an additional sample of the polyethylene was prepared by the same polymerization method. However, before being filtered and treated, about 500 ml. of the reaction mass (which essentially contained about a 10 percent by weight suspension of the raw polyethylene in hexane) was added to and stirred with about 500 ml. of a 0.05 percent by weight aqueous solution of an alkylated aryl polyether alcohol ("Triton X-100"), a non-ionic detergent. The stirring was done at room temperature in a Waring Blendor for a 5 minute period. The treated polymer was filtered and was given two additional washings in a similar manner with 500 ml. volumes of water. The treated and washed polymer was found to contain only about 0.033 percent by weight of chlorides. After being so treated the polyethylene molded to white specimens which did not show evidences of discoloration.

When two additional polyethylene samples which were prepared in the same way were treated in the foregoing manner with water alone, they were found to have chloride contents of 0.068 and 0.079 percent by weight respectively.

Example II

Two additional samples of polyethylene were prepared according to the procedure of Example I. However, before being filtered from the reaction mass and exposed to air, the polyethylene samples were treated with an aqueous solution of a non-ionic surface active polyglycol ether compound consisting of the dodecyl phenyl monoether of a polyethylene glycol having about 12 ethylene oxide units in the polyglycol chain. The treatment consisted of first stirring about 3 liters of a 10 percent by weight hexane suspension of each polyethylene sample for about ½ hour with 1500 ml. of water containing about 0.2 percent by weight of the polyglycol surfactant at a temperature of about 30° C. After this initial quench of the catalyst residue, each sample was treated repeatedly by being heated under reflux with consecutive 300 ml. volumes of 0.2 percent by weight aqueous solutions of the polyglycol ether surfactant for 4 hours. The decreasing chloride contents of each of the samples at various intervals during the treatment are indicated in the following table.

|  | Percent -Cl in First Sample | Percent -Cl in Second Sample |
|---|---|---|
| Quench | 0.077 | 0.094 |
| 1st reflux | 0.044 | 0.053 |
| 2nd reflux | 0.030 | 0.023 |
| 3rd reflux | 0.014 | 0.016 |
| 4th reflux | 0.013 |  |
| 5th reflux | 0.013 |  |
| 6th reflux | 0.012 |  |

Each of the treated polyethylene samples molded, without discoloration, to attractive white specimens.

Example III

When the procedures of Examples I and II were repeated with about 0.1 percent by weight solutions in water of "Triton NE"; "Pluronic L-62"; "Aerosol MA"; "Dynesol K50"; "Calgon"; "Versene" and "Armac 12D" similar excellent results were obtained. In all cases the treated polyethylene samples had good molding characteristics and were free from objectionable discoloration.

Since certain changes and modifications in the practice of the present invention can readily be entered into without substantially departing from its spirit and scope, it is to be understood that all the foregoing description be construed as being merely illustrative of certain of the embodiments of the invention.

What is claimed is:

1. In a process wherein a normally gaseous mono-alpha-olefin is polymerized with a Ziegler-type catalyst system which is of the class that is an admixture of (a) a strong reducing agent selected from the group consisting of aluminum trialkyls, dialkyl aluminum halides, dialkyl aluminum hydrides and dialkyl aluminum alkoxides and (b) a compound selected from the group consisting of halogenides, oxyhalogenides, complex halogenides, freshly precipitated oxides and hydroxides, alcoholates, acetates, benzoates and acetylacetonates of metals of groups IV-B, V-B and VI-B of the Mendeléeff Periodic System; and the resulting polymerized product is treated, before being permitted to be exposed to air, to inactivate catalyst residue therein, the improved treatment for the indicated purpose which consists of contacting the catalyst residue-containing polymerized product with water containing a dissolved synthetic detergent surfactant material before the polymer product is permitted to be exposed to air.

2. In a process wherein a normally gaseous mono-alpha-olefin is polymerized with a Ziegler-type catalyst system which is of the class that is an admixture of (a) a strong reducing agent selected from the group consisting of aluminum trialkyls, dialkyl aluminum halides, dialkyl aluminum hydrides and dialkyl aluminum alkoxides and (b) a compound selected from the group consisting of halogenides, oxyhalogenides, complex halogenides, freshly precipitated oxides and hydroxides, alcoholates, acetates, benzoates and acetylacetonates of metals of groups IV-B, V-B and VI-B of the Mendeléeff Periodic System; and the resulting polymerized product is treated, before being permitted to be exposed to air, to inactivate catalyst residue therein, the improved treatment for the indicated purpose which consists of contacting the catalyst residue-containing polymerized product with water containing between about 0.03 and 5.0 percent by weight of a dissolved synthetic detergent surfactant material at a temperature between the freezing and boiling points of the solution before the polymer product is permitted to be exposed to air.

3. In a process wherein a normally gaseous mono-alpha-olefin is polymerized with a Ziegler-type catalyst system which is of the class that is an admixture of (a) a strong reducing agent selected from the group consisting of aluminum trialkyls, dialkyl aluminum halides, dialkyl aluminum hydrides and dialkyl aluminum alkoxides and (b) a compound selected from the group consisting of halogenides, oxyhalogenides, complex halogenides, freshly precipitated oxides and hydroxides, alcoholates, acetates, benzoates and acetylacetonates of metals of groups IV-B, V-B and VI-B of the Mendeléeff Periodic System; and the resulting polymerized product is treated, before being permitted to be exposed to air, to inactivate catalyst residue therein, the improved treatment for the indicated purpose which consists of contacting and agitating each part by weight of the catalyst residue-containing polymerized product with at least about 0.5 part by weight of water containing between about 0.03 and 5.0 percent by weight of a dissolved synthetic detergent surfactant material at a temperature between the freezing and boiling points of the solution before the polymerized product is permitted to be exposed to air.

4. The method of claim 3 wherein the surfactant is a non-ionic surface active synthetic detergent material.

5. The method of claim 3, wherein the polymerized product is polyethylene.

References Cited in the file of this patent

UNITED STATES PATENTS

| | | |
|---|---|---|
| 2,567,109 | Howard | Sept. 4, 1951 |
| 2,599,300 | Upson | June 3, 1952 |
| 2,628,214 | Pinkney et al. | Feb. 10, 1953 |
| 2,728,753 | Russum et al. | Dec. 27, 1955 |
| 2,838,477 | Roelen et al. | June 10, 1958 |

FOREIGN PATENTS

| | | |
|---|---|---|
| 533,362 | Belgium | May 16, 1955 |